United States Patent
Lee et al.

(10) Patent No.: US 6,372,383 B1
(45) Date of Patent: Apr. 16, 2002

(54) METHOD FOR PREPARING ELECTRODES FOR NI/METAL HYDRIDE SECONDARY CELLS USING CU

(75) Inventors: Jai Young Lee; Kuk Jin Jang; Dong Myung Kim; Ji Sang Yu; Sang Min Lee; Ho Lee, all of Taejeon (KR)

(73) Assignee: Korea Advanced Institute of Science and Technology, Taejeon (KR)

(*) Notice: Subject to any disclaimer, the term of this patent is extended or adjusted under 35 U.S.C. 154(b) by 0 days.

(21) Appl. No.: 09/494,596

(22) Filed: Jan. 31, 2000

(51) Int. Cl.[7] .............................. H01M 4/66; H01M 4/58
(52) U.S. Cl. ..................... 429/218.2; 429/217; 429/245
(58) Field of Search ............................. 429/218.2, 217, 429/245

(56) References Cited

U.S. PATENT DOCUMENTS

| | | | |
|---|---|---|---|
| 4,636,445 A | * | 1/1987 | Yamano et al. ............... 429/53 |
| 5,922,493 A | * | 7/1999 | Humphrey et al. ......... 429/316 |
| 5,932,369 A | * | 8/1999 | Komada et al. ............. 429/59 |
| 6,030,724 A | * | 2/2000 | Sawa et al. ............... 429/218.2 |
| 6,171,727 B1 | * | 1/2001 | Ogura et al. ............. 429/218.2 |

OTHER PUBLICATIONS

Lee, Jon–Ha, "A Study on the Self-discharge Characteristics of a Sealed Nickel–Metal Hydride Battery." Department of Materials Science and Engineering, 1995, pp. 144, No month.

Sakai, T., et al., "Rare–earth–based Alloy Electrodes for a Nickel–metal Hydride Battery." Journal of Less–Common Metals, 172–174, 1991, pp. 1175–1184, No month.

Sawa. Haruo, "Electrochemical Properties of Zr–V–Ni System Hydrogen–Absorbing Alloys of Face Centered Cubic Structure." Materials Transaction, JIM, vol. 31, No. 6, 1990, pp. 487–492, No month.

* cited by examiner

Primary Examiner—Carol Chaney
Assistant Examiner—Tracy Dove
(74) Attorney, Agent, or Firm—Madson & Metcalf

(57) ABSTRACT

Disclosed is a method for preparing a high performance, negative electrode for Ni/metal hydride cells. A Zr-based hydrogen storage alloy, a binder comprising a mixture of polytetrafluoroethylene and 50th and a thickening agent (hydroxypropylmethyl cellulose), and a current collector comprising carbon black and copper are slurried and molded into a paste-type electrode. In a closed type cell, the copper repetitively undergoes melting and deposition on the electrode during charging and discharging cycles, allowing the electrode to show a similar change in surface morphology and electrochemical properties to that of a conventionally electroless plated electrode. Giving a contribution to the improvement in cell properties, including inner cell pressure, high rate dischargeability and energy density per volume, the method can substitute conventional alloy surface modifying methods, such as electroless plating methods and other pre-treatment processes necessary for the preparation of electrodes, which are difficult to practice owing to the production of pollution of the environment and to requirement of additional procedures.

19 Claims, 11 Drawing Sheets

METHOD FOR PREPARING ELECTRODES FOR NI/METAL HYDRIDE SECONDARY CELLS USING CU

BACKGROUND OF THE INVENTION

1. Field of the Invention

The present invention relates, in general, to a method for preparing electrodes for Ni/metal hydride (hereinafter referred to as "MH") secondary cells and, more particularly, to the use of copper in preparing electrodes for Ni/MH secondary cells, thereby improving the performance of the electrodes.

2. Description of the Prior Art

As a rule, improvement of the negative electrodes for Ni/MH secondary cells is achieved by amelioration of active materials themselves, which consist of hydrogen storage alloys, current collectors and binders, and/or by additives. Aiming to maximize the properties the active materials themselves have, the amelioration comprises the change in alloy composition (alloy design) and the modification of alloy surface through, for example, electroless plating. In connection with the additive, the negative electrode is usually modified by taking advantage of copper (Cu) and nickel (Ni) for current collectors, and polytetrafluoroethylene (PTFE) and polyvinyl alcohol (PVA) for binders.

It is reported that the electroless-plating of Ni or Cu on the surface of electrodes can improve the low temperature dischargeability and current density dependence thereof (T. Sakai, J. Less-Common Metals, 172–174 (1991) 1175). The electroless-plating processes suggested by T. Sakai et al., however, suffer from disadvantages of being complicated and producing pollution of the environment owing to their toxic by-products.

A method of improving the general functions of electrodes by changing the properties that active materials themselves have, rather than by the additional processes, such as electroless plating, is disclosed (H. Sawa, Mat. Trans. JIM, 31 (1990) 487). According to the disclosure, the content of Ni in a hydrogen storage alloy is increased from the start of the alloy's design. However, the discharge capacity of the electrode is found to decrease with the increasing of the Ni content.

Lee observed that the surfaces of electroless-plated alloy powders are coated with Cu or Ni particles less than 10 $\mu$m in size (thesis for Ph. D. in KAIST, Taejon Korea (1995)). This electroless-plating can prevent electrodes from being in direct contact with electrolytes, thereby extending the life span of the electrodes. In addition, it is also reported that, when forming the electrodes with the alloy powders, the electroless-plating improves the electrodes in moldability and electroconductivity. However, the functional improvement of the electrodes is difficult to control because the size of the plated particles, a main factor to determine the functions, is changed depending on the conditions of the plating processes. Another significant disadvantage of the electroless plating technique is that it is difficult to prolong the plating effect for cycles of charge/discharge because the lattice expansion of the alloy, which occurs upon charging and discharging, causes the electrodes to powder, leading to the breakage of the plating layer.

Hydrogen storage alloys are the metals or alloys which are able to absorb or discharge hydrogen reversibly at certain temperatures under certain pressures. In order for the hydrogen storage alloys to be applied in practice, they are required to have reversibly available, large hydrogen storage capacities as well as show rapid hydrogenation in electrolytes.

Hydrogen storage alloys for Ni/MH secondary cells, developed thus far, can be divided largely into two types: $AB_5$ type and $AB_2$ type, wherein A is an element having a high affinity for hydrogen, i.e., an alkaline earth element, such as La, Ce, Ti, Zr, etc., and B is a transition metal or transition metals selected from Ni, Mn, Co, Fe, Al, etc. Each type suffers from its own disadvantage. For example, the $AB_5$ type, of which La—Ni and Mn—Ni are representative, is low in energy storage density while the $AB_2$ type, exemplified by Zr—Ni and Ti—Ni, is poor in its general functions.

In recent, research on the development of hydrogen storage alloys has been directed to the $AB_2$ type on account of its security for high capacity.

Generally, the surface properties of hydrogen storage alloys are determined by alloy design, the coating and etching of alloy surfaces and/or additives. It is very difficult to design alloy compositions as being excellent in thermodynamic properties, that is, as having large hydrogen storage capacity as well as superior surface properties. The coating and etching of alloy surfaces is problematic in that the solution used needs additional processes for its treatment, which are usually carried out in harmful atmospheres. In contrast, the surface property improvement by additives is easy to apply for paste-type electrodes because useful additives can be simply mixed upon the formation of the electrodes without additional processes.

As an additive for improving the surface properties of the alloy, Cu powder has been recommended. For example, in Korean Pat. Appl'n No. 97-1526, it is disclosed that a great reduction in reaction resistance can be achieved on the surface of Cu powder-mixed electrodes. Also, the patent reveals that the reduction is attributed to the fact that the mixed Cu powder undergoes the melting and deposition during cycles of charging and discharging so that it is uniformly dispersed over the surface of the electrode to increase the effective reaction surface of the electrode. In addition, it is reported that a Cu coating of $AB_5$ type hydrogen electrode alloy improves inner cell pressure properties (T. Sakai, J. Less-Common Metals, 172–174 (1991) 1194).

SUMMARY OF THE INVENTION

With the background in mind, the present inventors made a conception of the influence of Cu powder on electrode surface properties and inner cell pressure properties and found that electrodes with a certain fraction of Cu powder allow the secondary cells to be greatly improved in various properties, including inner cell pressure, high rate dischargeability, energy density per volume, etc., without changing the characteristic properties of the active materials consisting of hydrogen storage alloys, binders, and current collectors.

Therefore, it is an object of the present invention to provide a method for preparing electrodes for Ni/MH secondary cells which are superior in inner cell pressure, high rate dischargeability, and energy density per volume.

It is another object of the present invention to provide a method for preparing electrodes for Ni/MH secondary cells, which is simple and does not produce pollution of the environment.

Based on the present invention, the above objects could be accomplished by a provision of a method for preparing a negative electrode for Ni/metal hydride secondary cells, in which a composition comprises a hydrogen storage alloy, a binder and a current collector comprising copper.

In an embodiment of the present invention, the hydrogen storage alloy is a powder with a size of −400 mesh (38 μm or smaller), the binder comprises a mixture of from 1:1 to 2:1 polytetrafluoroethylene: acrylic polymer in water (preferably brand name 503H of O-Gong Bond Co., Korea, a mixture of 32 wt % acrylic polymer in water) at an amount of from 2 to 4 wt %, and preferably 3.6 wt % based on the weight of hydrogen storage alloy, and hydroxypropyl methyl cellulose at an amount of from 0.3 to 0.8 wt % and preferably 0.5 wt % based on the weight of the hydrogen storage alloy, the hydroxypropyl methyl cellulose serving as a thickener, and a current collector is used at an amount of from 1 to 2.5 wt %, and preferably 1.5 wt % based on the weight of the hydrogen storage alloy.

BRIEF DESCRIPTION OF THE DRAWINGS

The above and other objects, features and other advantages of the present invention will be more clearly understood from the following detailed description taken in conjunction with the accompanying drawings, in which:

FIG. 5a is a graph showing the change of inner cell pressure according to charging and discharging and FIG. 5b is a histogram showing the compositions of gas at a charging step and a discharging step, respectively;

DETAILED DESCRIPTION OF THE INVENTION

The present invention pertains to the development of novel electrodes with which the Ni/MH secondary cells can be made to be of high capacitance and high performance. In the present invention, negative electrodes are prepared in an alloy surface modification process, in order to improve general performance of $AB_2$ type hydrogen storage alloys.

For the purpose of examining the characteristics of a cathode, conventionally, the electrode is made into a pellet form after cold pressing. However, a pellet type electrode is not employed in a cell in practice. Accordingly, a paste type hydrogen storage alloy electrode is fabricated in the present invention. In this regard, a hydrogen storage alloy, a current collector and a binder are used as materials for the electrode.

Useful in the present invention is an active material which comprises a hydrogen storage alloy of $Zr_{0.9}Ti_{0.1}(Mn_{0.7}V_{0.5}Ni_{1.2})_{0.92}$, a current collector, and a binder.

Usually, a large quantity of alloy is needed in fabricating an electrode in a paste type. Accordingly, rather than arc-melting, vacuum induction melting (VIM) is useful for the mass production of alloy. The elements of the alloy composition, that is, Zr, Ti, V, Mn, Ni, are all 99% or higher in purity as in the arc-melting. Using VIM, an alloy is prepared from the elements under such a condition that the alloy should be the same as that prepared by arc-melting in pressure-composition-isotherm (PCT) curve, discharge capacity, and rate capability. The molten alloy is pulverized to powders with a size of −400 mesh (38 μm or less).

The binder comprises a mixture of from 1:1 to 2:1 PTFE: acrylic polymer in water (brand name 503H of O-Gong Bond Co., Korea, a mixture of 32 wt % acrylic polymer in water) at an amount of from 2 to 4%, and preferably 3.6% by weight based on the weight of the hydrogen storage alloy, and a thickener at an amount from 0.3 to 0.8%, and preferably 0.5% by weight based on the weight of the hydrogen storage alloy.

For the current collector, carbon black is used in combination with Cu powder. Preferred is a mixture of from 1:9 to 1:1 carbon black:Cu powder. This current collector is used at an amount of from 1 to 2.5%, and preferably 1.5% by weight based on the weight of the hydrogen storage alloy.

Figure 1:
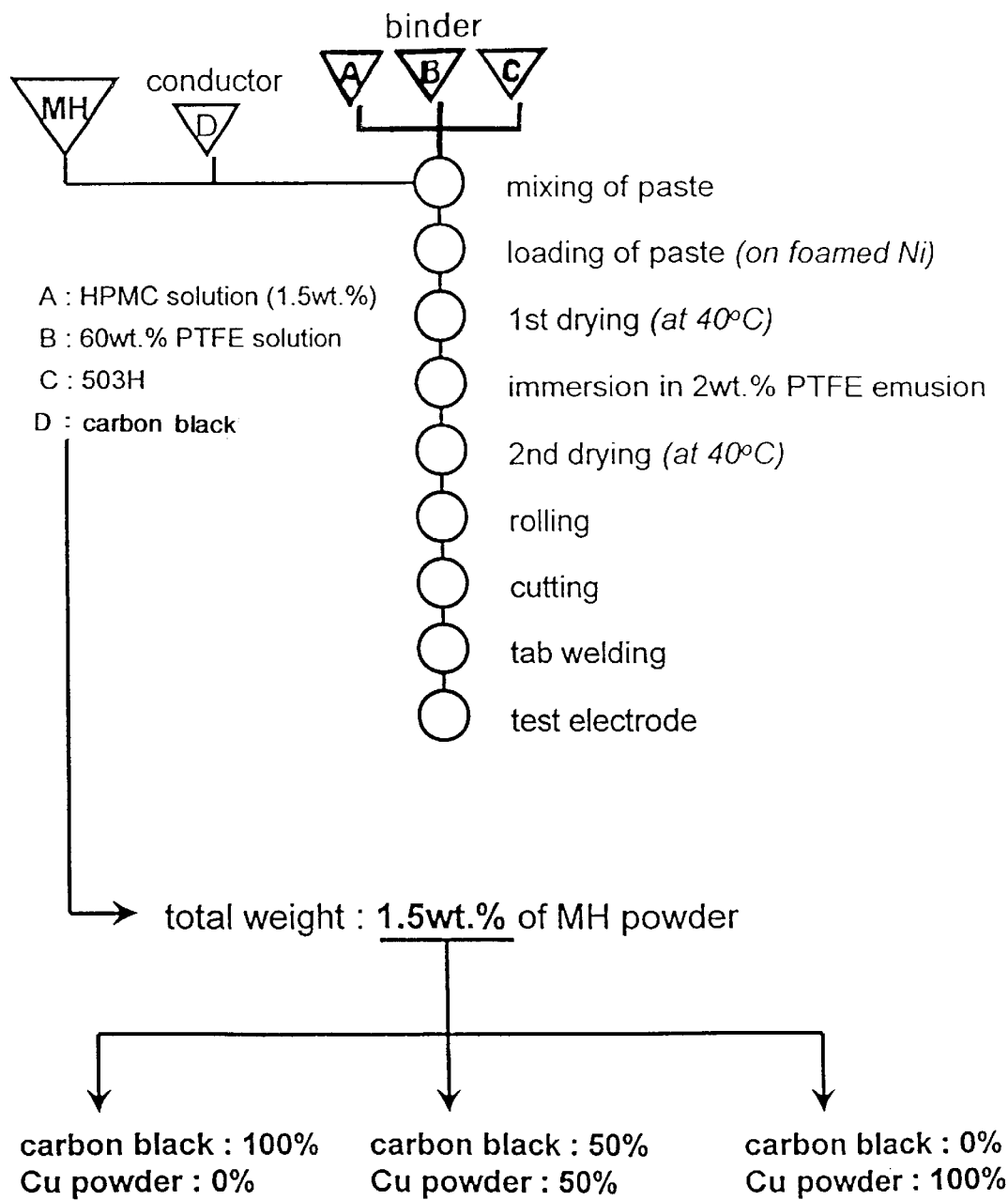
FIG. 1 is a process flow for preparing negative electrodes for closed type cells.

A composition for the active material is slurried and formed into a paste-type electrode in the process procedure illustrated in FIG. 1.

A better understanding of the present invention may be obtained in light of the following examples which are set forth to illustrate, but are not to be construed to limit the present invention.

TEST EXAMPLE

Typically, a cell consists of a negative electrode plate, a positive electrode plate, a separator, and an electrolyte. In order to test the paste type electrode made of a mixture of 50:50 carbon black and Cu powder according to the present invention, it was used as a negative electrode of a cell. A paste-type $Ni(OH)_2$ electrode was used as the positive electrode, a non-woven plate made of grafted propylene as the separator, and a 30 wt % KOH solution as the electrolyte.

The cell was designed to have a discharge capacity of 800 mAh while the solution was used at an amount of 2.5–3.0 cc. In this regard, a design of limiting the capacity of the positive electrode was adopted to fix the ratio of negative electrode to positive electrode (n/p ratio) at 1.25. The cell was repetitively charged and discharged at 30° C. The charging was conducted at rates of 0.2 C, and 0.5 C to the charge extent of 120% while the discharging was done down to a potential of 1.0 V at rates of 0.2 C, 0.5 C and 1 C, respectively. A break between the charging and the discharging lasted for 1 hour. During cycles of the charging and discharging, an examination was made of various properties of the cell.

For comparison, the negative electrode was made by using carbon black or Cu powder only, instead of a mixture of 50:50 carbon black:Cu powder.

Figure 2:
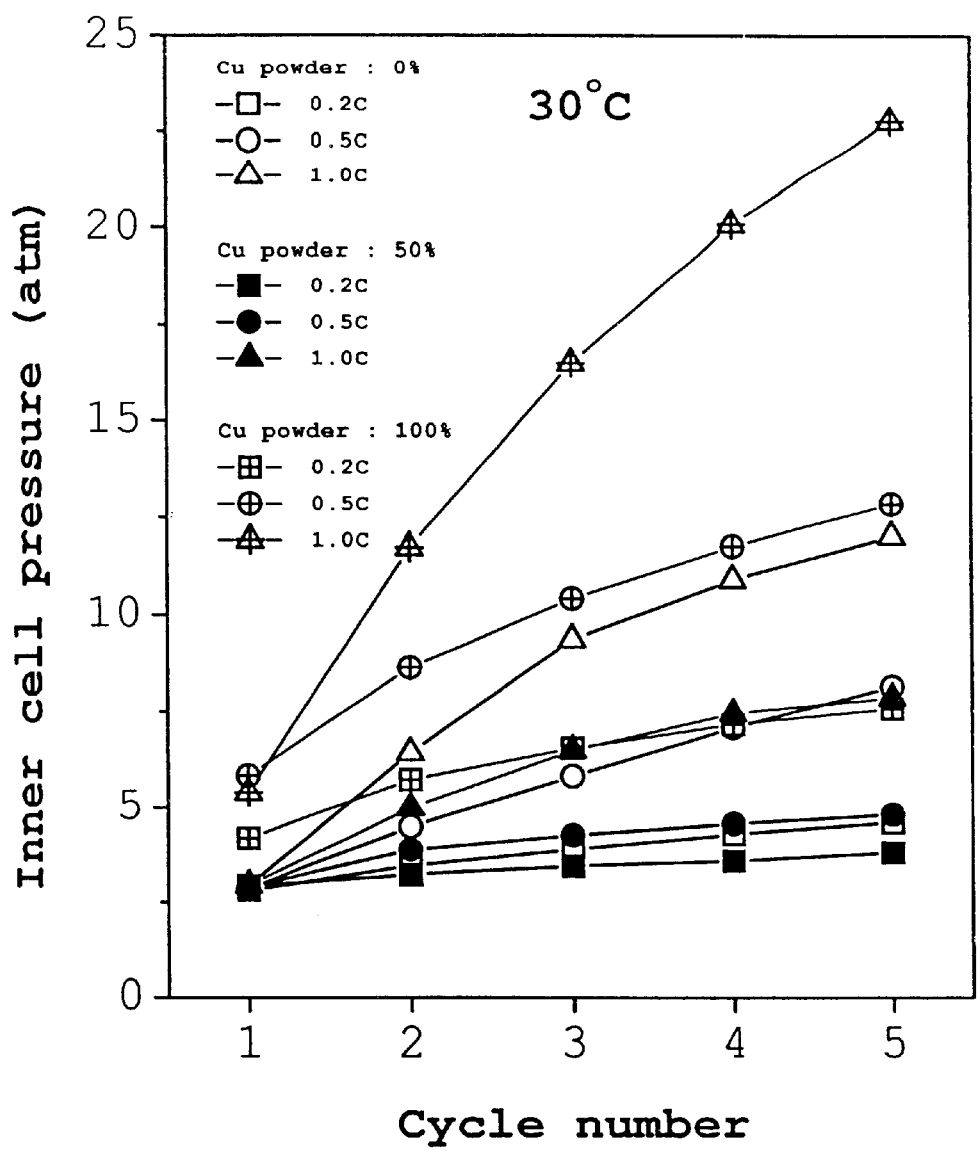
FIG. 2 shows changes in the inner cell pressures of the cells, whose negative electrodes comprise current collectors respectively made of 100% carbon black, 50% carbon black+50% Cu powder, and 100% Cu powder, with regard to the cycles of charging and discharging at rates of 0.2 C, 0.5 C and 1.0 C.

With reference to FIG. 2, the inner cell pressures of the cells, whose negative electrodes comprise current collectors respectively made of 100% carbon black, 50% carbon black+50% Cu powder, and 100% Cu powder, are plotted with regard to the cycles of charging and discharging. As shown in this graph, the inner cell pressure is increased, regardless of the amount of Cu powder, as the cycle of charging and discharging is repeated. A better result of the inner cell pressure is observed in the cell, whose negative electrode comprises a current collector made of a mixture of 50:50 carbon black:Cu powder, than in the other cells. That is, as the charging and discharging rate increases, the inner cell pressure of the cell employing the 50:50 carbon black:Cu powder electrode increases at a significantly lower rate than do those of the two other cells. In addition, the electrode containing no carbon black shows even higher inner cell pressure than that containing no Cu powders.

Figure 3:
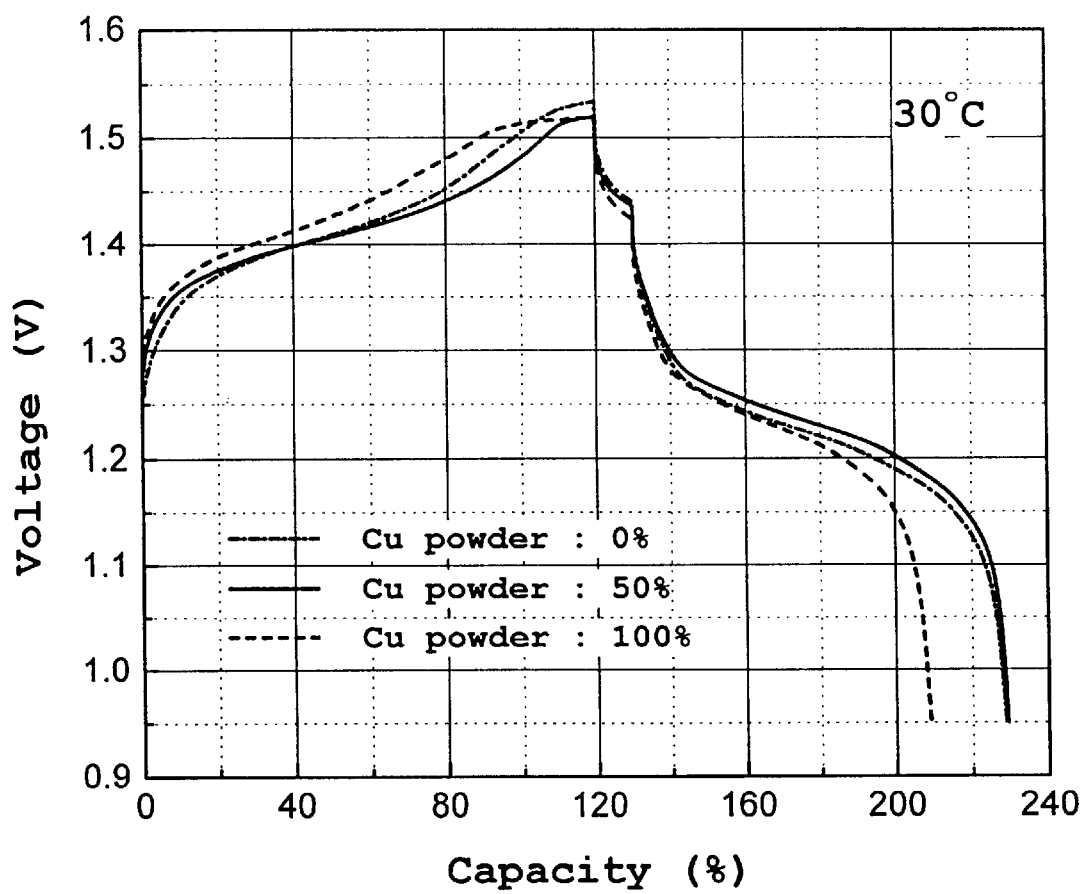
FIG. 3 shows potential curves of the cells, whose Zr—Ti—Mn—V—Ni negative electrodes comprise current collectors respectively made of 100% carbon black, 50% carbon black+50% Cu powder, and 100% Cu powder, when charging and discharging at a rate of 0.2 C.

With the aim of examining the difference in the inner cell pressure among the electrodes, they were tested for charging efficiency. The result is given in FIG. 3. In this figure, the electrode, which comprises a current collector made of carbon black only or a mixture of 50:50 carbon black:Cu powder, shows a charging efficiency of almost 100% while the charging efficiency of the other electrode, that is, the electrode whose current collector is made of Cu powder only is not more than about 80%. According to electrochemical impedance spectroscopy (EIS) data, this difference is ascribed to the fact that the absence of carbon black in the electrode significantly raises the resistance of the electrode. Under the condition of fixing the amount of the current collector at 1.5% of the weight of the hydrogen storage alloy, it is difficult for Cu powder to be uniformly dispersed over the electrode because Cu powder is of higher density than carbon black.

As recognized, the electrode whose current collector is made of a mixture of 50:50 carbon black:Cu powder is superior in inner cell pressure to the electrode whose current collector is made of carbon black only, although they are almost the same in the charging efficiency. The recombination reaction of electrodes is helpful in understanding this phenomenon.

Figure 4:
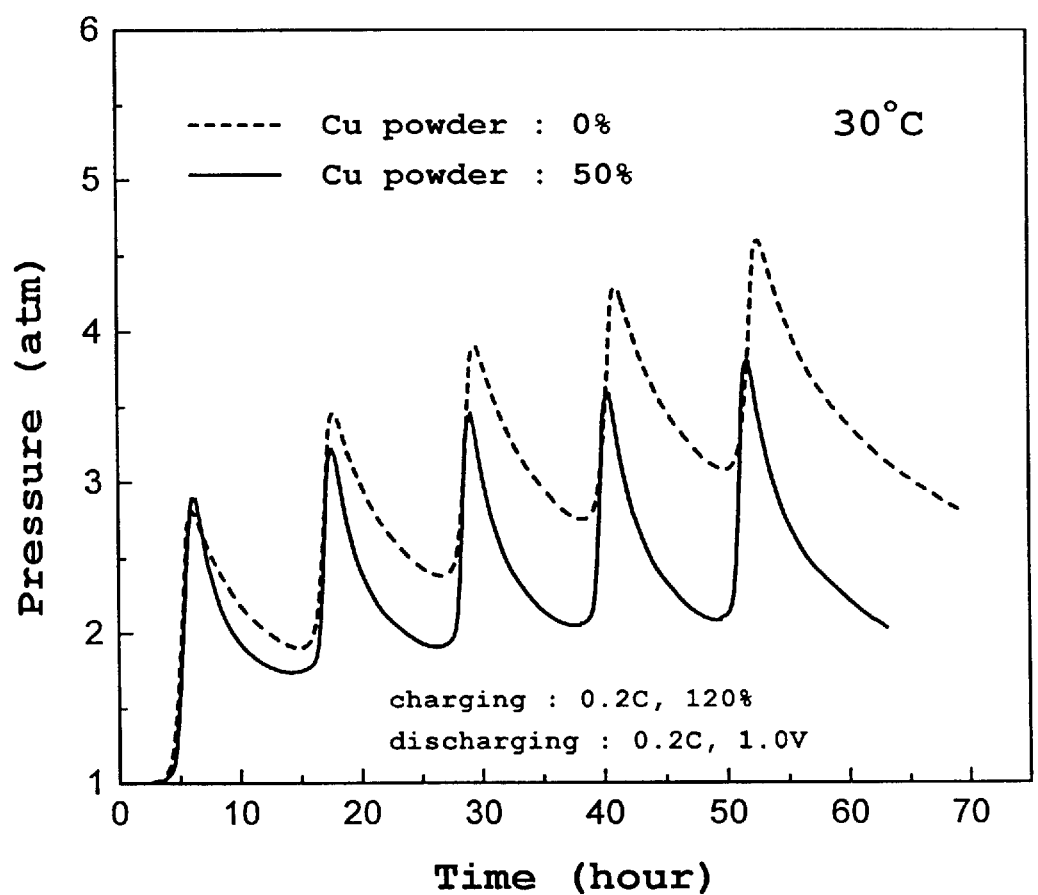
FIG. 4 is a graph showing the changes in the inner cell pressures of two Zr—Ti—Mn—V—Ni electrodes which contain no Cu powder and 50% Cu powder instead of carbon black, respectively, during the cycles of charging at a rate of 0.2 C to 120% and discharging at a rate 0.2 C to 1.0 V.

With reference to FIG. 4, there are curves showing the changes in the inner cell pressures of two electrodes which contain no Cu powder and 50% Cu powder instead of carbon black, respectively, during the cycles of charging and discharging. There is a great difference in recombination reaction between the two electrodes. That is, more active recombination reaction occurs in the electrode containing a mixture of 50:50 carbon black:Cu powder than in the electrode containing no Cu powder.

Figure 5:
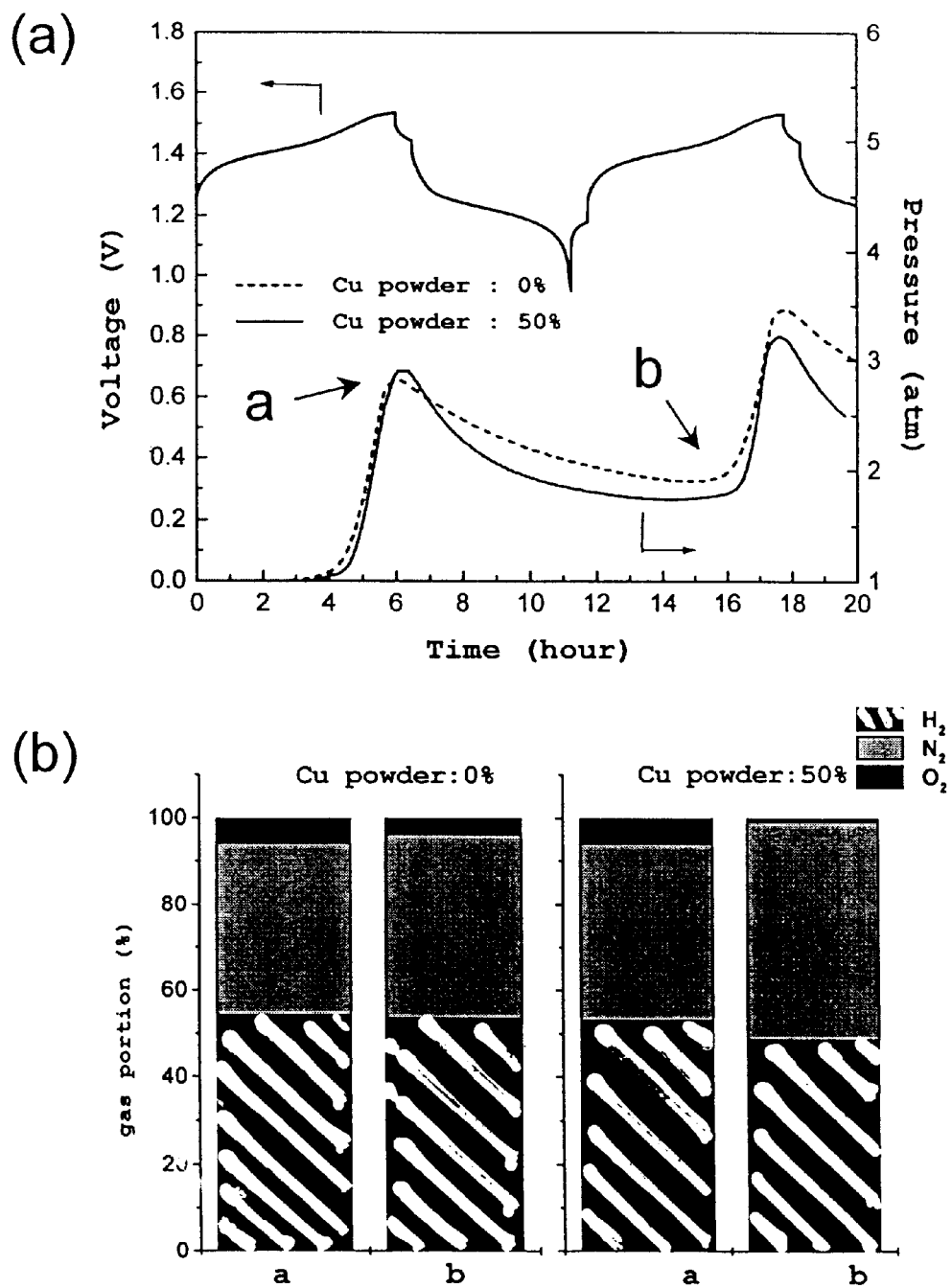
FIG. 5 shows a comparison of the gas generated in closed type cells of the electrodes containing 0 wt % and 50 wt % Cu powder based on the weight of the current collectors, respectively.

To determine which gas was actively recombined with the electrode during the recombination reaction, gas analysis was done. The result is given in FIG. 5 which shows a comparison of the gas generated in closed type cells of the electrodes containing 0 wt % and 50 wt % Cu powder based on the weight of the current collectors, respectively. FIG. 5a is a graph showing the change of inner cell pressure according to charging and discharging and FIG. 5b is a histogram showing the compositions of gas at a charging step and a discharging step, respectively. It is apparent from the data that the gas present in the cell employing the 50 wt % Cu powder-mixed electrode, is, for the most part, hydrogen while almost no oxygen exists. A smaller amount of hydrogen is present in the case of the 50 wt % Cu powder-mixed electrode than in the case of the electrode containing no Cu powder. Hence, the recombination reaction of hydrogen and oxygen occurs more actively in the Cu powder-mixed electrode than in the electrode containing no Cu powder.

In order to understand the change in the gas composition, the surface properties of the electrodes were examined. Since the oxygen consumption reaction occurs on the surface of the metal hydride alloy electrode, the factors to affect such reaction include the reaction surface area of the MH electrode and the catalytic activity for the reaction. Thus, after being completely activated, the electrode was measured for its pores and surface area with the aid of a penetrometer and observed for its morphology by SEM, so as to examine the reaction surface area and surface composition of the electrode. After being activated, electrodes have the surface areas shown in the following Table 1. As apparent from Table 1, the surface area of the electrode containing 50 wt % Cu powder instead of carbon black is nothing but a one fourth of that of the electrode containing no Cu powder, to the contrary of the expectation. This is a contrary result to the report of J. H. Jung in which the electrode containing Cu powder is increased in effective surface area by the melting and deposition of the Cu powder.

TABLE 1

Surface Areas of Electrodes Having Current Collectors of 0 wt % and 50 wt % Cu Powder

| Cu powder within Electrode (wt %) | 0 | 50 |
|---|---|---|
| Surface Area ($m^2/cm^2$ of electrode) | 1.184 | 0.281 |

Figure 6:
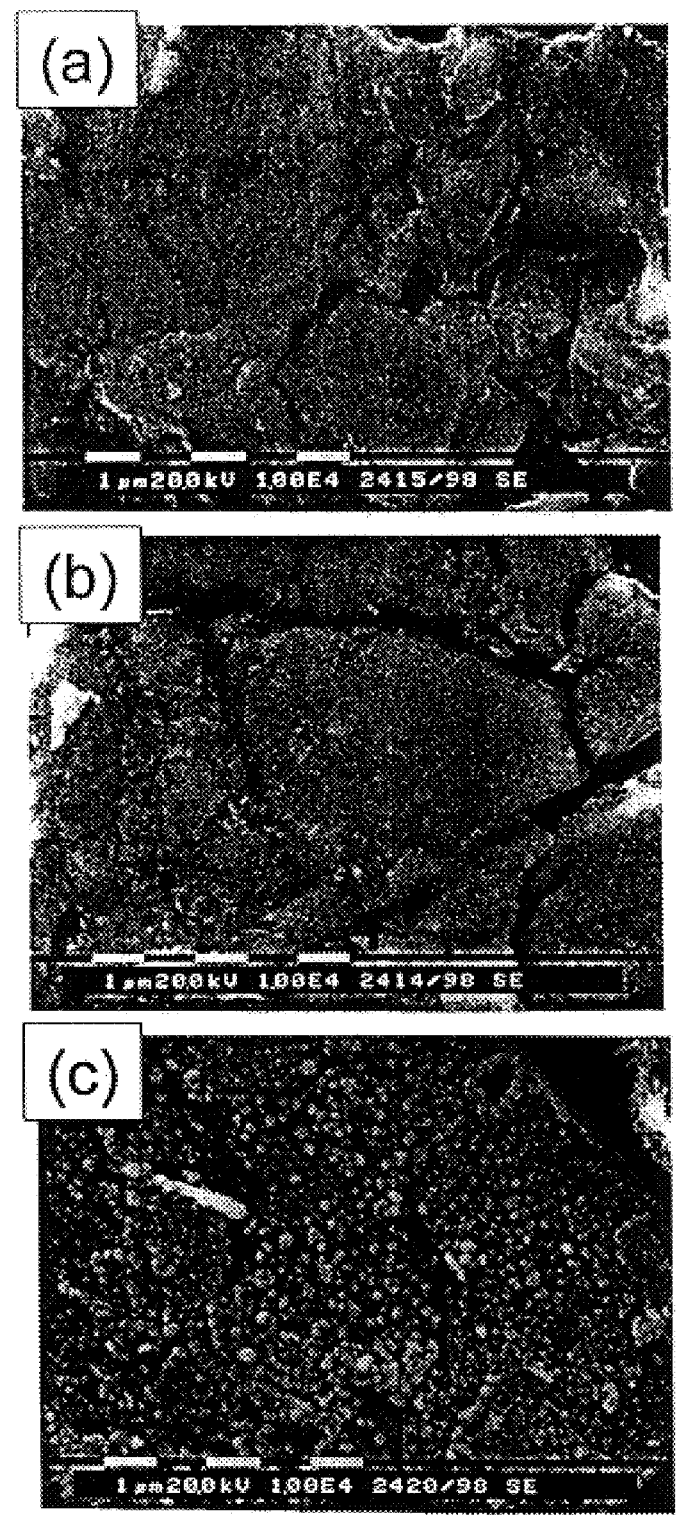
FIGS. 6a to 6c are scanning electron microphotographs (SEM) showing the surface morphology of completely activated Zr—Ti—Mn—V—Ni alloy electrodes containing Cu powder at amounts of 0 wt % (a), 0.75 wt % (b) and 10 wt % ▢ based on the weight of the alloys, respectively.

Observation of the surface morphology of the electrodes gave the solution to the contrary result. With reference to FIG. 6, there are surface morphology of the electrodes according to the amounts of Cu powder. No traces resulting from the melting and deposition of Cu powder were found in the electrode containing 50 wt % Cu powder instead of carbon black. When Cu powder was mixed at an amount of 10% of the weight of the metal hydride alloy, Cu deposits could be observed.

Figure 7:
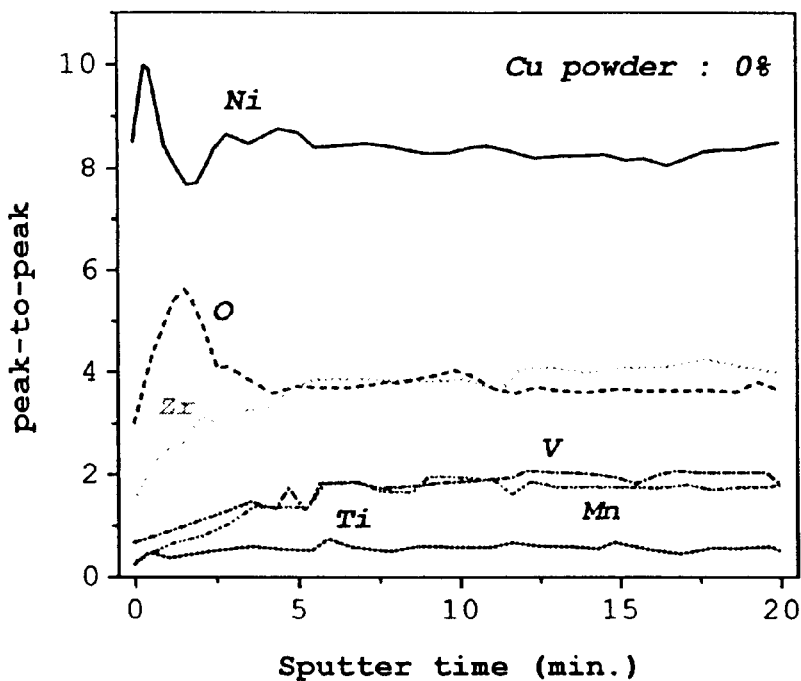
FIGS. 7a and 7b are Auger electron spectroscopy (AES) depth profiles showing the surface composition changes of Zr—Ti—Mn—V—Ni alloy electrodes containing Cu powder at amounts of 0 wt % (a) and 50 wt % (b) based on the weight of the current collectors, according to the depths of the alloy electrode, respectively.
Figure 7:
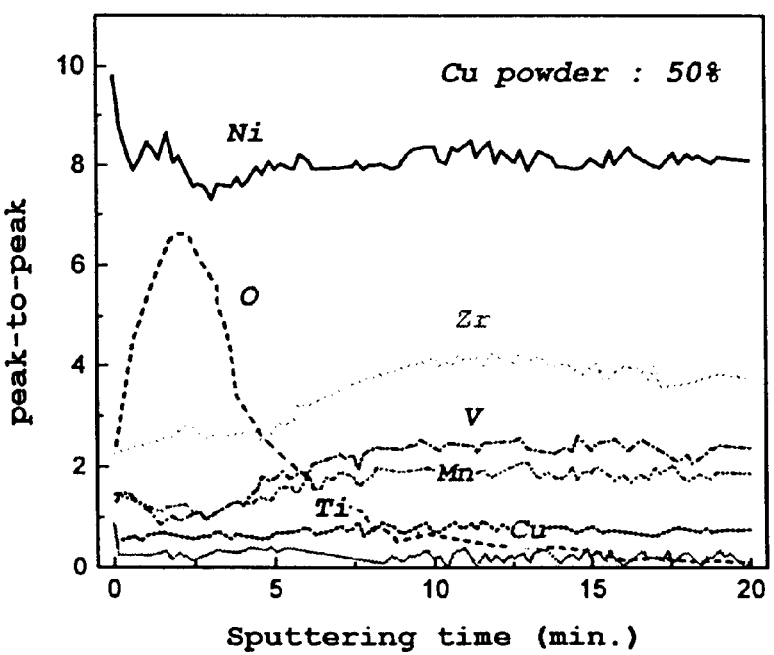
Figure 8:
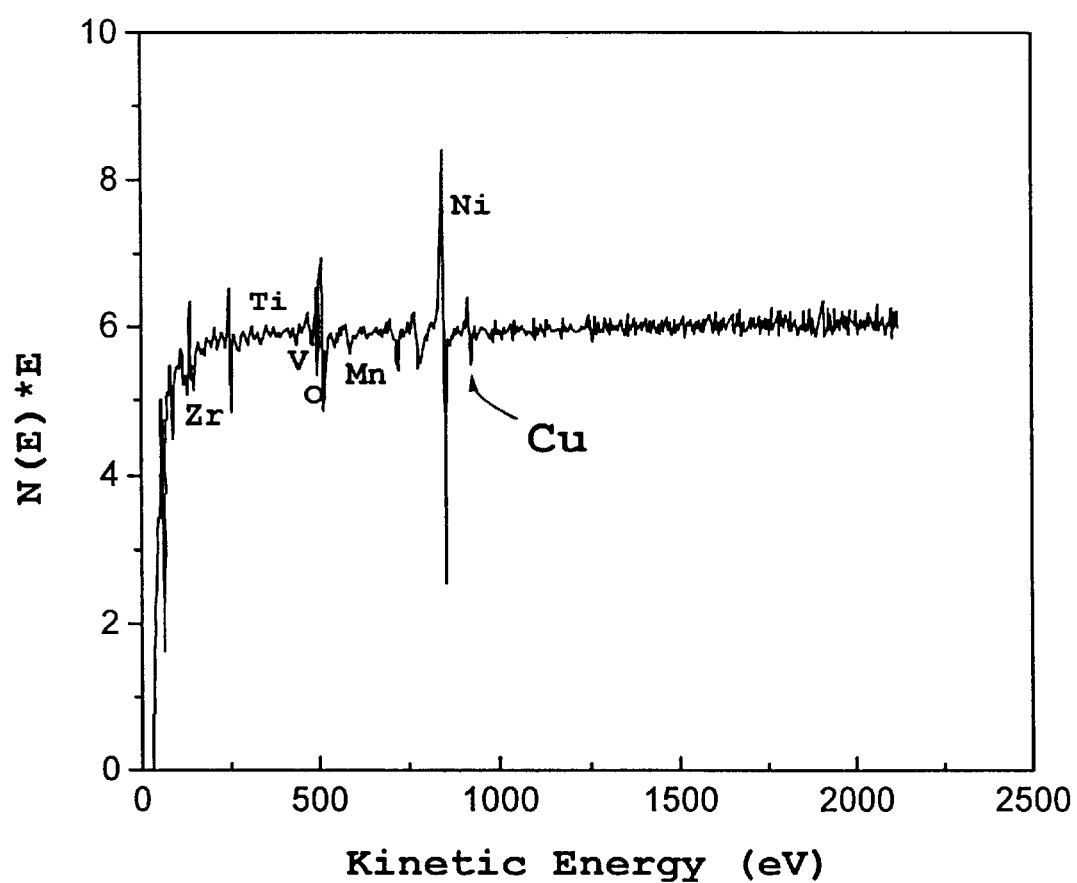
FIG. 8 is an AES spectrum of a Zr—Ti—Mn—V—Ni alloy electrode containing Cu powder at an amount of 50 wt % based on the weight of the current collector.

Therefore, when Cu powder is mixed according to the present invention, it is believed that the change of the surface properties predominates over the change of the reaction surface area in the alloy. To confirm this, the composition of the alloy surface was investigated by Auger electron spectroscopy (AES) depth profiling. FIG. 7 shows the results of the AES depth profiling on the electrodes containing 0 wt % and 50 wt % Cu powder instead of carbon black. As shown, Ni is present at similar concentrations on the two electrodes while the oxide thickness is significantly reduced on the surface of the electrode containing 50 wt % Cu powder instead of carbon black, compared with the surface of the electrode containing no Cu powder. This result indicates a high possibility of the presence of metallic Ni on the electrode containing the Cu powder and can be construed for the Cu mixed electrode to be greatly improved in the catalytic activity on oxygen recombination reaction, based on the result of D. Y. Yan (D. Y. Yan, J. Alloys and Compounds, 290 (1994) 257). Particularly, Cu, which was not detected with SEM, was observed to be present thinly on the surface of the electrode, as shown in FIG. 8. Although Cu powder was unable to be analyzed with SEM owing to its small amount (0.75% of the weight of the metal hydride alloy) in the 50 wt % mixed electrode, its melting and deposition occurred in practice.

Figure 9:
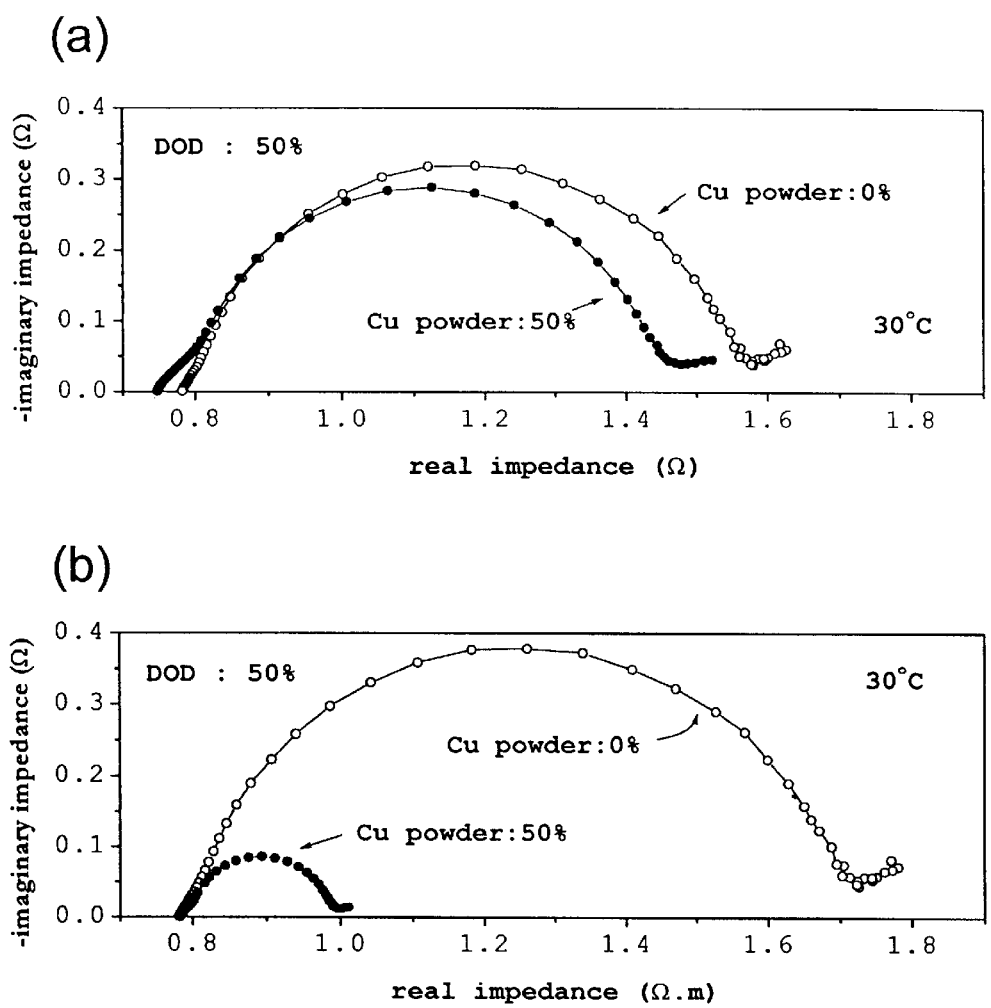
FIGS. 9a and 9b are impedance spectra of electrodes containing Cu powder at amount of 0 wt % and 50 wt % based on the weight of the current collectors before (a) and after (b) normalization against reaction surface areas of the electrodes.

EIS analysis is very useful in confirming the improvement in the catalytic activity on the electrode surface. As seen in FIG. 9a, the resistance element of the electrode containing no Cu powder is larger than that of the electrode containing 50 wt % Cu powder instead of carbon black. However, since these resistance elements result from whole electrode reaction, the reaction surface area factors are reflected in the resistance elements. In order to exclude the reaction surface area factors, the results are normalized against the reaction surface areas of the electrodes, respectively, before the investigation into reaction resistance per alloy surface area. The resistance to surface reaction of each electrode, which is normalized against reaction surface area, is shown in FIG. 9b. The Cu mixed electrode is even smaller in the normalized resistance to surface reaction than is the electrode containing no Cu powder. That is, the mixing of Cu powder gives rise to a great increase in the catalytic activity per surface area.

Figure 10:
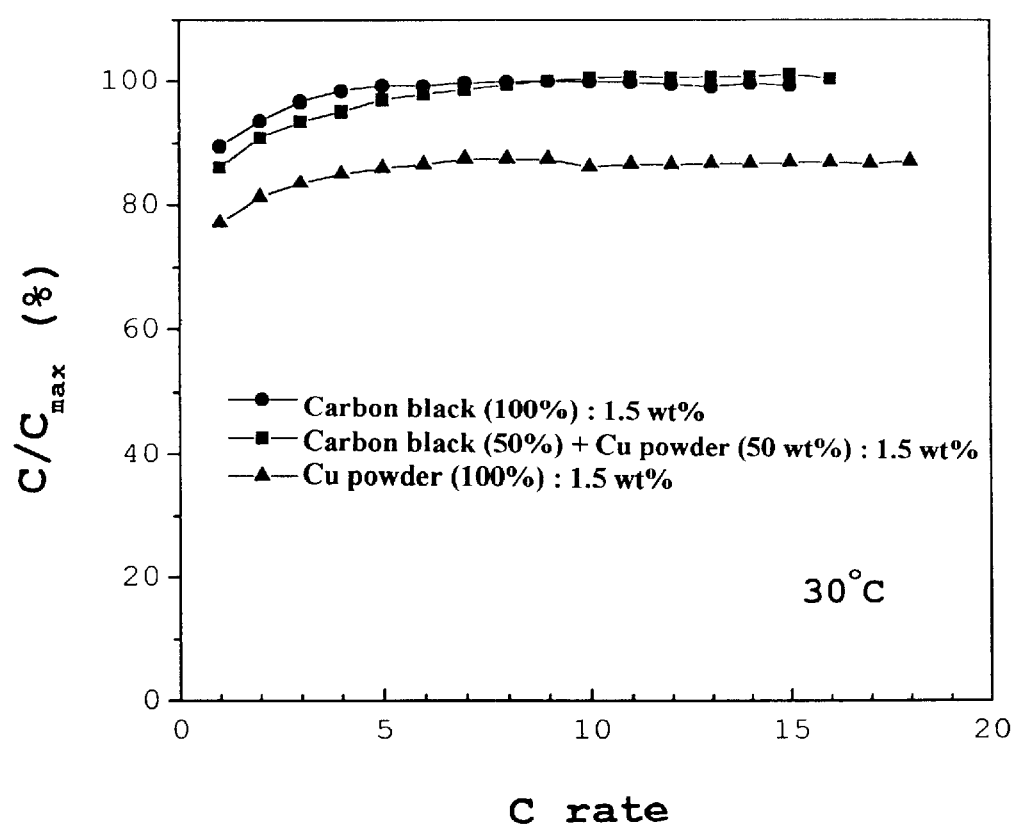
FIG. 10 shows the rate capability of the cells, whose Zr—Ti—Mn—V—Ni negative electrodes comprise current collectors respectively made of 100% carbon black, 50% carbon black+50% Cu powder, and 100% Cu powder.
Figure 11:
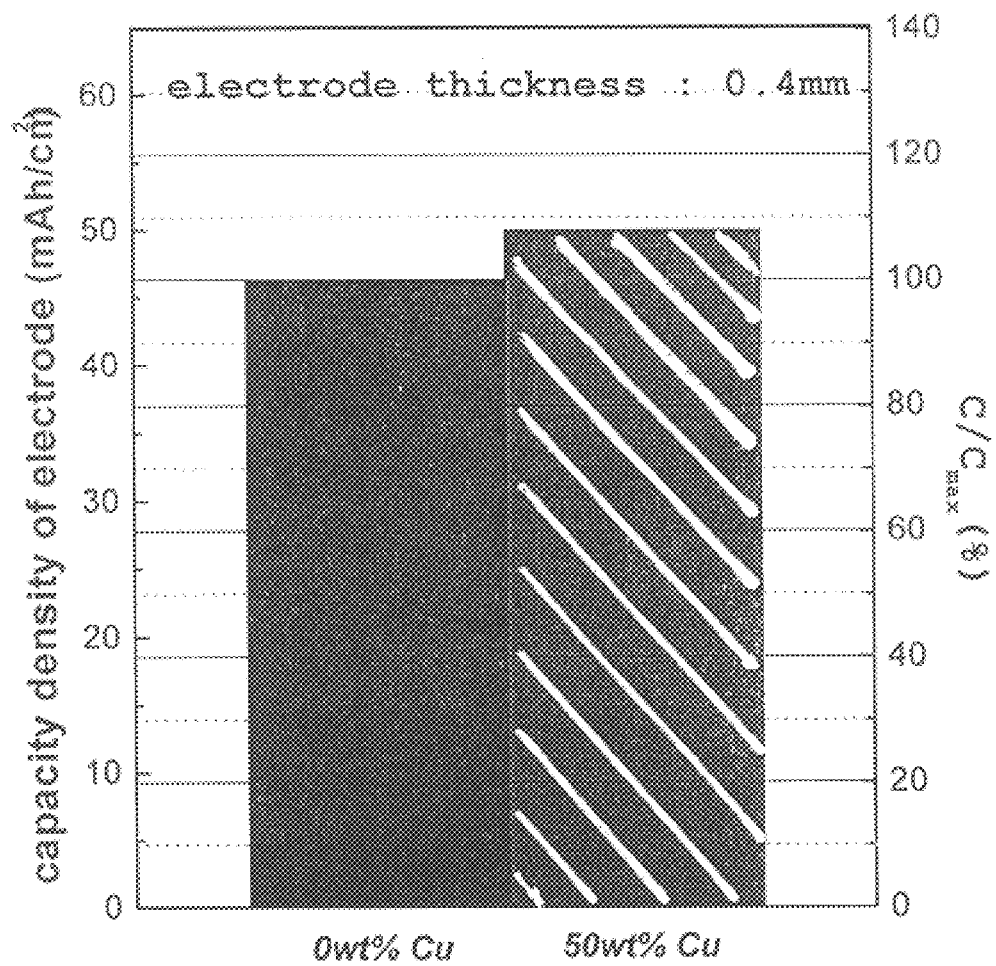
FIG. 11 shows the energy densities per volume of the electrodes, whose current collectors contain Cu powder at amounts of 0 wt % and 50 wt %.

With reference to FIG. 10, it is shown that the rate capability is further improved when Cu powder is mixed at 50 wt % instead of carbon black. This result can be sufficiently explained by the great improvement in the catalytic activity per surface area. FIG. 11 shows an increase in the energy density per volume when Cu powder is mixed at 50 wt % instead of carbon black, which can be easily deduced from the fact that carbon black powder is of even lower density than Cu powder.

Consequently, when a cell is fabricated using a paste type electrode which comprises Cu, instead of carbon black, at a certain fraction, the resulting Ni/MH secondary cell is far superior in general properties, including rate capability, inner cell pressure, and energy density per volume, to those fabricated by conventional methods.

T. Sakai et al., reported that $AB_5$ type hydrogen storage alloys have a longer life span when being coated with Cu powder than when being not coated with Cu powder because the Cu powder acts as a barrier to the oxidation of the alloy in the electrolyte. Q. D. Wang reported a similar result, as well (J. Less-Common Metals, 172–174 (1991) 1265). Accordingly, the Cu powder which is mixed to prepare an electrode from a Zr-based hydrogen storage alloy, acts to prevent the oxidation of the alloy within the electrolyte to increase the existence probability of metallic Ni on the surface of the alloy, thereby leading to an increase in the catalytic activity for the oxygen recombination reaction of the alloy. By taking advantage of the procedure, a significant reduction can be brought about in the inner cell pressure during cycles of charging and discharging.

As described hereinbefore, the present invention provides a method for preparing a high performance, negative electrode for Ni/MH secondary cells, which can be substituted for conventional electroless plating methods and other pretreatment processes necessary for the preparation of electrodes. The method can give a contribution to the commercialization of the Ni/MH secondary cells utilizing $AB_2$ type hydrogen storage alloy electrodes, which have not been commercialized due to their poor general functions including high rate dischargeability, low temperature current dependence, etc, and to the development of the electric vehicles whose performance is greatly determined by the performance and the capacity of secondary cells.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A negative electrode for a Ni/metal hydride secondary cell comprising:
   a hydrogen storage alloy;
   a binder; and
   a current collector comprising a mixture of from 10:90 to 50:50 wt. % carbon black:copper.

2. A negative electrode according to claim 1, wherein the hydrogen storage alloy is a powder with a size of −400 mesh (<38 μm).

3. A negative electrode according to claim 1, wherein the binder comprises a mixture of polytetrafluoroethylene and acrylic polymer in water.

4. A negative electrode according to claim 1, wherein the binder comprises a 1:1 to 2:1 mixture of polytetrafluoroethylene:acrylic polymer in water.

5. A negative electrode according to claim 1, wherein the binder is present at a concentration of about 2 to 4 wt. % of the hydrogen storage alloy.

6. A negative electrode according to claim 1, further comprising a thickener.

7. A negative electrode according to claim 6, wherein the thickener is hydroxypropyl methyl cellulose.

8. A negative electrode according to claim 6, wherein the thickener has a concentration of from 0.3 to 0.8 wt. % of the hydrogen storage alloy.

9. A negative electrode according to claim 1, wherein the current collector is present in an amount of from 1 to 2.5 wt. % based upon the amount of hydrogen storage alloy present in the electrode.

10. A negative electrode according to claim 1, wherein the hydrogen storage alloy is $Zr_{0.9}Ti_{0.1}(Mn_{0.7}V_{0.5}Ni_{1.2})_{0.92}$.

11. A negative electrode for a Ni/metal hydride secondary cell comprising:
   a powder hydrogen storage alloy having a size of −400 mesh (<38 μm);
   a binder;
   a thickener; and
   a current collector comprising a mixture of carbon black and copper.

12. A negative electrode according to claim 11, wherein the binder comprises a mixture of polytetrafluoroethylene, acrylic polymer in water.

13. A negative electrode according to claim 12, wherein the binder comprises a 1:1 to 2:1 mixture of polytetrafluoroethylene:acrylic polymer in water.

14. A negative electrode according to claim 12, wherein the binder is present at a concentration of about 3.6 wt. % of the hydrogen storage alloy.

15. A negative electrode according to claim 14, wherein the thickener is hydroxypropyl methyl cellulose.

16. A negative electrode according to claim 15, wherein the thickener has a concentration of about 0.3 to 0.8 wt. % of the hydrogen storage alloy.

17. A negative electrode according to claim 16, wherein the current collector is present in an amount of from 1 to 2.5 wt. % based upon the amount of hydrogen storage alloy present in the electrode.

18. A negative electrode according to claim 17, wherein the current collector comprises a mixture of from 10:90 to 50:50 wt. % carbon black:copper.

19. A negative electrode according to claim 18, wherein the hydrogen storage alloy is $Zr_{0.9}Ti_{0.1}(Mn_{0.7}V_{0.5}Ni_{1.2})_{0.92}$.

* * * * *